March 11, 1941.  A. ESSEX ET AL  2,234,337
VARIABLE SPEED DEVICE
Filed May 15, 1940   2 Sheets-Sheet 1

INVENTORS
Alois Essex
Elliott P. Ross
BY
Victor D. Borst
ATTORNEY.

March 11, 1941.    A. ESSEX ET AL    2,234,337
VARIABLE SPEED DEVICE
Filed May 15, 1940    2 Sheets-Sheet 2
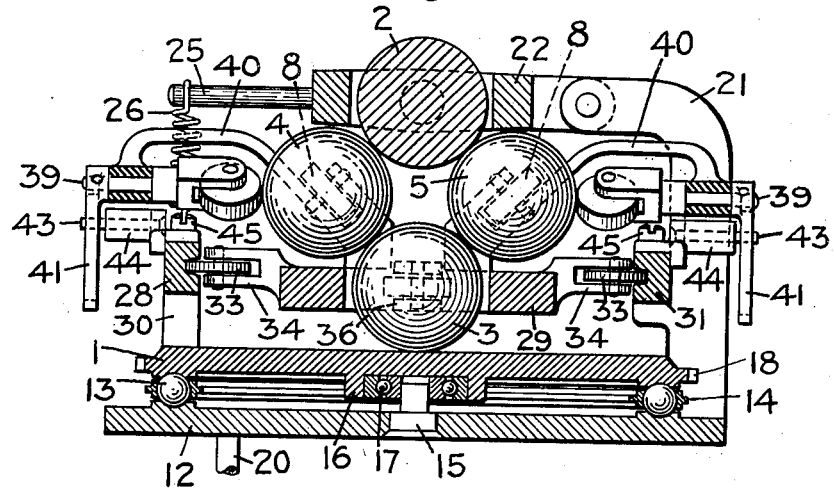
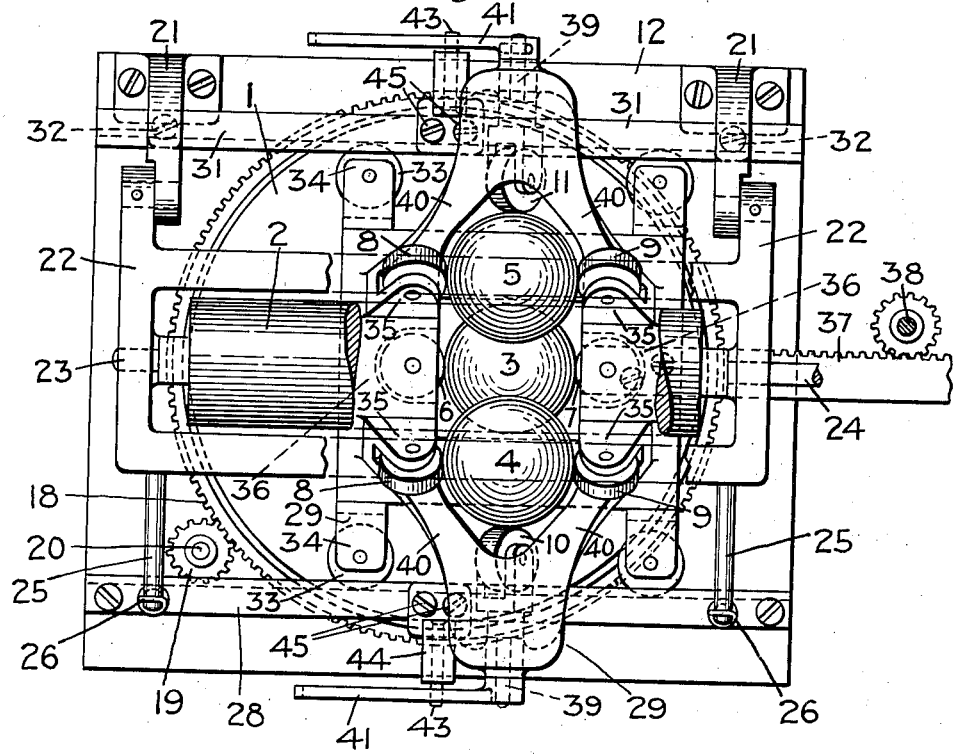
INVENTORS
Alois Essex
Elliott P. Ross
BY
ATTORNEY.

Patented Mar. 11, 1941

2,234,337

UNITED STATES PATENT OFFICE 2,234,337

VARIABLE SPEED DEVICE

Alois Essex, Ridgewood, and Elliott P. Ross, Forest Hills, N. Y., assignors to Ford Instrument Company, Inc., Long Island City, N. Y., a corporation of New York Application May 15, 1940, Serial No. 335,230

8 Claims. (Cl. 74—198)

This invention relates to variable speed devices and more particularly to variable speed mechanisms of the ball and roller type.

The principal object of the invention is to provide a variable speed device of the ball and roller type which will transmit a greater torque than has heretofore been known.

Another object of the invention is to provide a variable speed device of the ball and roller type in which three driving balls are interposed between the driving disk and the driven roller.

Another object of the invention is to provide a variable speed device of the ball and roller type in which the pressure between the roller and the ball in contact with the disk is distributed through two balls.

Other objects of the invention will be apparent from a consideration of the specification and drawings in which:

Fig. 6 is another elevational view of the device, chiefly in section along the line 6—6 of Fig. 5; and Fig. 7 is a plan view of the device with the roller and some of its associated elements broken away to more clearly show parts lying between them.

Figure 1:
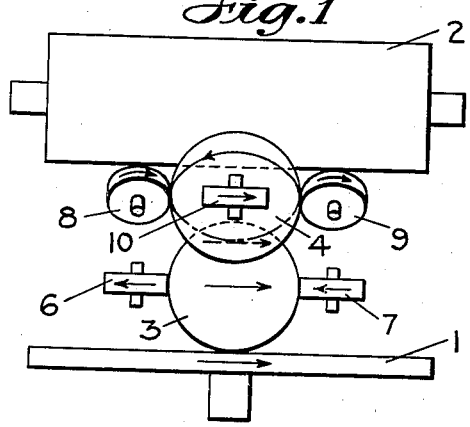
Fig. 1 is a simplified drawing in elevation of the device to aid in explaining its principles and showing the balls in one position with relation to the disk.
Figure 3:
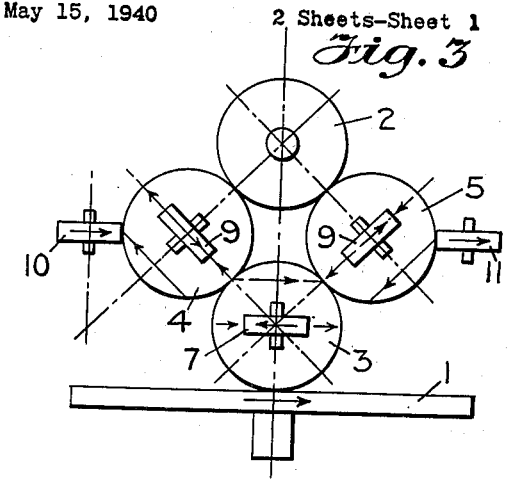
Fig. 3 is a simplified diagram in elevation taken at right angles to that of Fig. 1.
Figure 2:
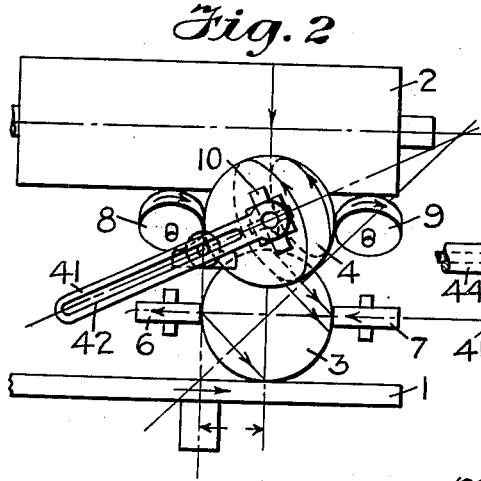
Fig. 2 is a similar diagram showing the balls in another position.
Figure 4:
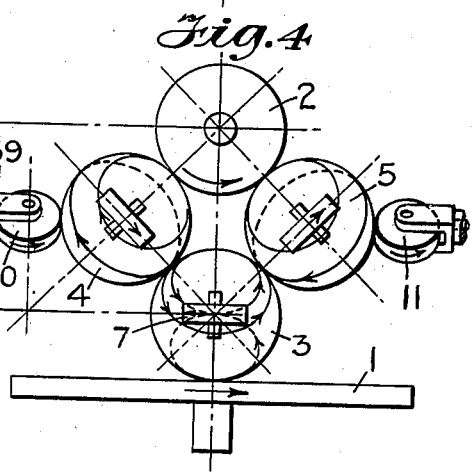
Fig. 4 is a diagram similar to Fig. 3, but showing the balls in the position they occupy in Fig. 2.

Before describing the preferred embodiment of the invention in detail, the principles underlying it will be explained with the aid in Figs. 1 to 4 inclusive. As disclosed in Rothwell et al. Patent No. 2,002,585, it is well known that in the ball and roller type of variable speed devices of the prior art, two balls are positioned between a driving disk 1 and a cylindrical driven roller 2 and for efficient operation the lower ball must rotate about an axis passing through the center of the disk at its surface. The reference patent discloses a mechanism to support a pair of guide rollers for the lower ball in this positional relation as the ball carriage is moved toward or away from the center of the disk.

In a great many mechanisms, devices of this type cannot be used because of the limited amount of power that can be transmitted by them, as there is a limit to the stress in the material due to the pressure that may be applied at the points of contact of the ball with the roller, between the balls and between the lower ball and the disk.

The relation of the stress S to the force or pressure P for the various conditions may be expressed as follows:

(a) Between a ball and a plane or disk__ $S=1.00\sqrt[3]{P}$
(b) Between ball and roller_____ $S=1.36\sqrt[3]{P}$
(c) Between two balls_____ $S=1.59\sqrt[3]{P}$ The relation between the radius of contact $r$ and the pressure P for the various conditions may be expressed as follows:

(d) Between ball and plane or disk_____ $r=1.00\sqrt[3]{P}$
(e) Between ball and roller_____ $r= .91\sqrt[3]{P}$
(f) Between two balls_____ $r= .79\sqrt[3]{P}$ It will be understood that in the above equations the constants are for determining the relative stress and radius of contact only and that to determine the actual values consideration must be given to the modulus of elasticity of the material used. Also it has been assumed that the balls and rollers are of the same diameter.

From consideration of the equations it may be concluded that the critical point in the system of the transmission of pressure between the roller and the disk is between the two balls, as in the equation defining the relation between stress and pressure between two balls, there occurs the factor constant of a value higher than in the other equations. The present invention therefore contemplates using three balls 3, 4, and 5, mounted as shown schematically in Figs. 1 to 4, whereby the stress between the two balls of the prior art type due to a given pressure on the system is now reduced by having the pressure path divided through the two balls 4 and 5 in contact with roller 2 and the lower ball 3.

The advantages of such an arrangement may be stated as follows: When a pressure of, say, one hundred pounds is exerted between the roller and the disk of the old and the new types, there would be a pressure of one hundred pounds between the two balls of the old type, whereas with the device of the present invention with three balls arranged with their centers at forty-five degrees angular relation with each other, the component of force between each contact of ball to ball would be fifty pounds divided by the sine of forty-five degrees, or slightly over seventy pounds.

Assuming that the driving force between two surfaces is proportional to the surface of contact, or the square of the radius of contact ($r^2$), it may be shown that with an allowed pressure of one hundred pounds between the roller and the disk, for a device of the present invention to produce a pressure of seventy pounds at the point of contact of ball to ball, and an allowed pressure of seventy pounds for a device of the prior art to produce seventy pounds at the point of contact between the balls, the torque transmitted to the roller of the present invention would be twice that transmitted by the previously known type.

Another advantage of the device of the present invention is that it is lower in overall height. These devices are often used in calculating devices where space is at a decided premium.

Whereas in the reference patent guide rollers are provided to keep the balls in alignment, it will be seen that because of the symmetrical arrangement of the idler balls 4 and 5, they restrain the lower ball 3 from movement in a direction at right angles to the vertical plane of the roller and hence only one pair of guide rollers, 6 and 7, is required for the lower ball. This pair of guide rollers need not be tilted in accordance with the position of the ball from the center of the disk as these rollers are under all conditions in rolling contact with the ball. Likewise the guide rollers 8 and 9, for the idler balls 4 and 5, need not be axially adjustable but are mounted at an angle of forty-five degrees from the horizontal.

However, the guide rollers 10 and 11 of the idler balls 4 and 5 must be adjustable in accordance with the distance of the ball carriage from the center of the disk for the following reasons: For true rolling between the driving disk 1 and the lower ball 3, the lower ball must turn about an axis in a plane perpendicular to the disk and passing through the center of the disk, which plane also includes the axis of the driven roller 2. Likewise for true rolling motion between the idler balls and the driven roller, the axis of rotation of the idler balls must lie in a plane including the axis of the roller. And for true rolling motion between the lower ball and the idler balls, the axes of rotation of the idler balls must be positioned in their planes along the intersection of their planes with a plane containing the axis of rotation of the lower ball and the centers of the idler balls. These conditions will be met when the axes of rotation of the three balls intersect at a point on the axis of the driven roller, as shown in broken lines in Figs. 2, 3 and 4.

Figure 5:
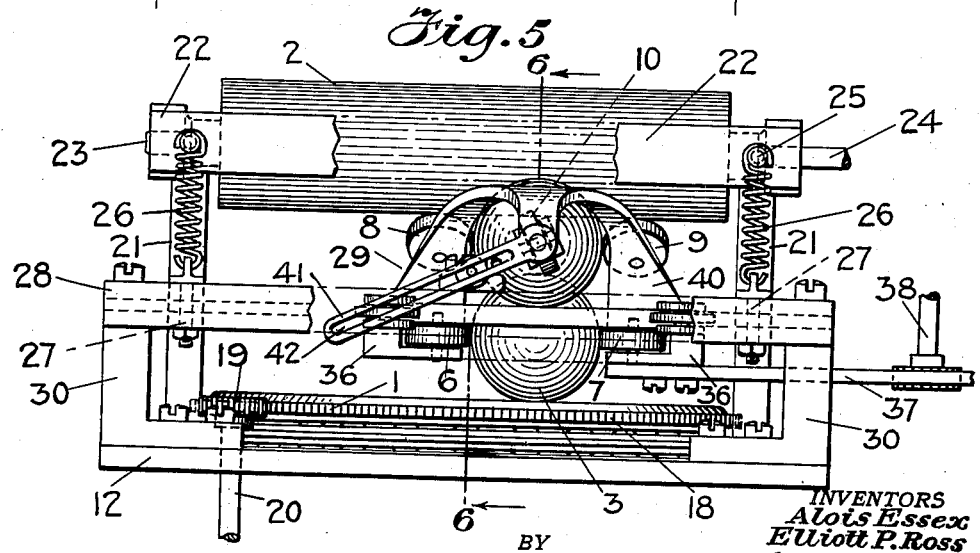
Fig. 5 is a view in elevation of the device with parts broken away to more clearly reveal other parts, the balls being shown in substantially the same position as in Fig. 2.

Referring to Figs. 5, 6 and 7, which show in detail a preferred embodiment of the invention, 12 designates a base on which disk 1 is rotatably supported by balls 13 within an annular retainer 14. In order to insure that the disk is properly centered under all conditions, the base is provided with a stud 15 which projects within an annular boss 16 formed in the lower side of the disk 1. Ball bearing 17 is placed between the boss and the upper end of the stud. The periphery of the disk is provided with teeth 18 which engage a pinion 19 on the end of a shaft 20, extending to a suitable source of power by which the disk may be driven.

As shown in Figs. 6 and 7, the base 12 carries a pair of standards 21 having inwardly extending ends to which is pivotally attached a frame 22, within which the roller 2 is rotatably mounted by a stub shaft 23 at one end and an extending shaft 24 at the other end, the latter shaft leading to the device to which the movement of the roller is to be transmitted. The frame 22 carries a pair of pins 25 on the free ends of which are connected springs 26 attached to bolts 27 passing through a bar 28 which also serves as one guide for the ball carriage 29 of the mechanism. The bar 28 is carried on supports 30 attached to the base 12 as shown in Fig. 5.

A companion guide bar 31 is attached to the standards 21 by screws 32 as shown in Fig. 7. Figure 6 shows that the inner faces of the guide bars are slotted to receive rollers 33 mounted between lugs 34 at the corners of the carriage 29.

Secured to the plate of the carriage 29 at an angle of forty-five degrees from the horizontal are four bifurcated lugs 35 which carry the fixed rollers 8,8 and 9,9 which bear against the balls 4 and 5. Also suspended from the plate of carriage 29 are lugs 36 which carry rollers 6 and 7, which bear against ball 3, as shown more clearly in Fig. 5. The ball carriage 29 is moved or translated in a direction parallel to the axis of roller 2 by a bar 37 which is connected at one end to the lug 36 and at the other end by a rack and pinion to shaft 38, the rotation of which represents the variable input into the device.

The guide rollers 10 and 11 are supported in position and against idler balls 4 and 5 by bifurcated pins 39, which are journaled in lugs 40, secured to the carriage 29. The axes of rotation of guide rollers 10 and 11 are controlled by arms 41 secured to the pins 39. These arms have slots 42 cut in them which permits cooperation of arms 41 with pins 43 mounted in lugs 44 which are secured to the bars 28 and 31 respectively by screws 45. It will thus be seen that as the carriage 29 moves outward from the center of the disk 1, arms 41 pivot about pins 43 and through pins 39 vary the angles at which rollers 10 and 11 engage the balls 4 and 5.

It will be obvious to those skilled in the art that various modifications may be made to the embodiment disclosed such as, for example, mounting the driving disk 1 and roller 2 in fixed bearings and applying a pressure therebetween by forcing the idler balls 4 and 5 towards each other by springs applied through the guide rollers 10 and 11.

It is obvious that various changes may be made by those skilled in the art in the details of the embodiment of the invention disclosed in the drawings and described above within the principle and scope of the invention as expressed in the appended claims.

We claim:

1. In a variable speed mechanism including a driving element, a driven element and a plurality of spherical members therebetween adapted to transmit motion from the driving element to the driven element, one of the members being in contact with the driving element and a pair of the members being in symmetrical contact with the said one member and the driven element, means for translating the members relative to the elements, a guide roller for each of said pair of members, each of said rollers being in contact with and being adjustable in position relative to its respective member, and means for adjusting the positions of the rollers in accordance with the translation of the members relative to the elements, whereby true rolling contacts between the respective rollers and members are maintained.

2. In a variable speed mechanism including a driving element, a driven element and a plurality of spherical members therebetween adapted to transmit motion from the driving element to the driven element, one of the members being in contact with the driving element and a pair of the members being in symmetrical contact with the said one member and the driven element, means for applying a pressure between the driving element and the driven element, means for translating the members relative to the elements, a guide roller for each of said pair of members, each of said rollers being in contact with and being adjustable in position relative to its respective member, and means for adjusting the positions of the rollers in accordance with the translation of the members relative to the elements, whereby true rolling contacts between the respective rollers and members are maintained.

3. In a variable speed mechanism including a driving element, a driven element and a plurality of spherical members therebetween adapted to transmit motion from the driving element to the driven element, one of the members being in contact with the driving element and a pair of the members being in symmetrical contact with the said one member and the driven element, means for applying a pressure between the driving element and the driven element, means for translating the members relative to the elements, means for adjusting the position of the translating means, a guide roller for each of said pair of members, each of said rollers being in contact with and being adjustable in position relative to its respective member, and means for adjusting the positions of the rollers in accordance with the translation of the members relative to the elements, whereby true rolling contacts between the respective rollers and members are maintained.

4. In a variable speed mechanism including a driving element, a driven element and a plurality of spherical members therebetween adapted to transmit motion from the driving element to the driven element, one of the members being in contact with the driving element and a pair of the members being in symmetrical contact with the driven element, means for applying a pressure between the driving element and the driven element, means for translating the members relative to the elements, means for adjusting the position of the translating means, guide rollers in contact with the members, one guide roller of each of said pair of members being adjustable in position relative to its member, and means for adjusting the positions of the rollers in accordance with the translation of the members relative to the elements, whereby true rolling contacts between the respective rollers and members are maintained.

5. In a variable speed mechanism, a rotary driving disk, a rotary driven roller, a plurality of balls therebetween for transmitting motion from the disk to the roller in proportion to the position of the balls from the center of the disk, means for translating the balls radially of the disk, said translating means including means to position one of said balls in contact with the disk, a pair of guide rollers mounted on the translating means and in axially adjustable contact with a pair of the said balls in symmetrical driving contact with the driven roller and the one ball, and means for adjusting the guide rollers in accordance with the position of the translating means whereby true rolling contacts between the guide roller and the pair of balls is maintained.

6. In a variable speed mechanism, a rotary driving disk, a rotary driven roller, a plurality of balls therebetween for transmitting motion from the disk to the roller in proportion to the position of the balls from the center of the disk, means for applying a pressure between the disk and the roller, means for translating the balls radially of the disk, said translating means including means to position one of said balls in contact with the disk, a pair of guide rollers mounted on the translating means and in axially adjustable contact with a pair of the said balls in symmetrical driving contact with the driven roller and the one ball, and means for adjusting the guide rollers in accordance with the position of the translating means whereby true rolling contact between the guide rollers and each of the pair of balls is maintained.

7. In a variable speed mechanism, a rotary driving disk, a rotary driven roller, a plurality of balls therebetween for transmitting motion from the disk to the roller in proportion to the position of the balls from the center of the disk, means for applying pressure between the disk and the roller, means for translating the balls radially of the disk, said translating means including means to position one of said balls in contact with the disk, means for adjusting the position of the translating means, a pair of guide rollers mounted on the translating means and in axially adjustable contact with a pair of the said balls in symmetrical driving contact with the driven roller and the one ball, and means for adjusting the guide rollers in accordance with the position of the translating means whereby true rolling contact between the guide rollers and each of the pair of balls is maintained.

8. In a variable speed mechanism, a rotary driving disk, a rotary driven roller, a plurality of balls therebetween for transmitting motion from the disk to the roller in proportion to the position of the balls from the center of the disk, means for applying a pressure between the disk and the roller, means for translating the balls radially of the disk, said translating means including means to position a ball in contact with the disk, means for adjusting the position of the translating means, guide rollers mounted on the translating means and in contact with the balls for locating the balls radially of the disk, a pair of guide rollers mounted on the translating means and in axially adjustable contact with a pair of the said balls in symmetrical driving contact with the driven roller and the one ball, and means for adjusting the guide rollers in accordance with the position of the translating means whereby true rolling contact between the guide rollers and each of the pair of balls is maintained.

ALOIS ESSEX.
ELLIOTT P. ROSS.